United States Patent [19]

Forrest

[11] Patent Number: 4,783,305

[45] Date of Patent: Nov. 8, 1988

[54] GENERATOR FOR RADIONUCLIDE

[75] Inventor: Terence R. F. Forrest, Pinner, England

[73] Assignee: Amersham International plc., Buckinghamshire, England

[21] Appl. No.: 23,897

[22] Filed: Mar. 11, 1987

Related U.S. Application Data

[63] Continuation of Ser. No. 576,405, Feb. 2, 1984, abandoned.

[30] Foreign Application Priority Data

Feb. 9, 1983 [GB] United Kingdom ................. 8303558

[51] Int. Cl.⁴ ......................... G01N 23/12; B67D 5/00

[52] U.S. Cl. ............................. 376/186; 250/432 PD; 422/103; 73/426; 222/164

[58] Field of Search ................. 376/186; 250/432 PD; 251/206; 422/103; 73/426, 429; 222/454, 164, 165, 166, 362, 364, 431, 432, 442, 452

[56] References Cited

U.S. PATENT DOCUMENTS

| | | | |
|---|---|---|---|
| 80,847 | 8/1868 | Wheeler | 73/429 |
| 367,474 | 8/1887 | Truman | 222/166 |
| 699,621 | 5/1902 | Humphreys . | |
| 872,989 | 12/1907 | Clarke . | |
| 1,092,384 | 4/1914 | Nickels | 73/426 |
| 1,223,207 | 4/1917 | Scypinski | 73/426 |
| 1,703,753 | 2/1929 | Schaum et al. | 222/166 |
| 3,736,101 | 5/1973 | Pirtle, Jr. . | |
| 3,739,948 | 6/1973 | Kontes | 222/166 |
| 4,387,303 | 6/1983 | Benjamins | 250/432 PD |
| 4,472,299 | 9/1984 | Weisner et al. | 252/645 |

*Primary Examiner*—John F. Terapane
*Assistant Examiner*—Eric Jorgensen
*Attorney, Agent, or Firm*—Wenderoth, Lind & Ponack

[57] ABSTRACT

A generator of radionuclides comprises a generator column (10) containing the radionuclide and provided with an inlet (12) and an outlet (14) for eluent, first and second reservoirs (16, 18) for eluent, and connecting means for passing a pre-determined column of eluent from the second reservoir through the generator column. A part defining the second reservoir, which part may be the second reservoir itself, is rotatable to determine the volume of eluent passed through the column. The second reservoir is preferably shaped as a sector of a cylinder rotatable around a horizontal axis.

The generator is well suited for vacuum elution of a variable pre-determined volume of eluent into a single size collection vial with subsequent drying of the generator column.

7 Claims, 2 Drawing Sheets

GENERATOR FOR RADIONUCLIDE

This application is a continuation of now abandoned application Ser. No. 576,405, filed Feb. 2, 1984, now abandoned.

This invention relates to generators for radionuclides of the kind in which a parent radionuclide, adsorbed on a column of particulate material, continuously generates by radioactive decomposition a daughter radionuclide which is periodically removed by elution from the column. This invention is mainly concerned with technetium generators, in which typically the parent radionuclide molybdenum-99 is adsorbed on a column of particulate alumina and the technetium-99m eluted using physiological saline solution. But as will appear, the invention is applicable in principle to generators of any radionuclide.

Commonly assigned co-pending European Patent Application No. 823021043 (publication No. 0068605) provides a generator of this kind comprising a generator column containing radionuclide and provided with an inlet and an outlet for eluent, a first reservoir for the eluent, a second reservoir to contain a variable pre-set volume of the eluent required for a single elution, means connecting the first and second reservoirs whereby the second reservoir can be filled up from the first, and means connecting the second reservoir to the column inlet whereby eluent can be caused to pass from the second reservoir through the column so as to elute the radionuclide therefrom. Preferred generators have the following advantages which cannot all be achieved simultaneously by any prior generator:

(i) The elution volume is easily variable through a wide range.

(ii) Elution is automatic; the operator does not have to be present.

(iii) Only a single vial, the collection vial, is needed for elution (single vial elution): some systems have required also the connection of a vial with a supply of eluent to the generator for each elution (dual vial elution).

(iv) The collection vial is only partly filled with liquid.

(v) The collection vial is at atmospheric pressure on completion of the elution process.

(vi) Excess liquid is removed from the column bed and from the connection lines, offering these advantages:

(a) Passage of air through the bed can be helpful in counteracting radiation chemistry effects which lower the elution yield of pertechnetate ion, Tc-99m, although other effective means exist of obviating this problem.

(b) If the system is designed to operate with the connection lines always full of liquid, there may be a need to "prime" the system before the first elution: this is an inconvenient step to manufacturer or user.

(c) In some systems designed to operate with the connection lines always full of liquid, there exists the possibility of unwanted expulsion of liquid from the lines because of, for example, generation of radiolytic gas in the column.

(vii) Only one size of collection vial and shield is required.

(viii) The generator column can be specially designed for activity to be elutable in a small volume.

(ix) The volume of eluate is not influenced by small changes in the degree of evacuation of the vial (e.g. as a result of air leakage into the vial).

The generator described in our European Patent Specification achieved these advantages by the use of a second reservoir which contained a variable pre-set volume of the eluent required for a single elution. Variable volume reservoirs have the disadvantage of being rather expensive, and this may be aggravated by the need to keep the contents in a sterile condition.

The present invention seeks to achieve the same advantages by a different approach, namely by providing a reservoir of fixed volume which delivers a variable volume of eluate determined by its orientation. Generators incorporating such reservoirs can be simpler and cheaper to manufacture, with fewer components, and in some cases simpler to operate. Rotation of the second reservoir lends itself to easier control from the working surface of the generator. In one embodiment, described below, the absence of relatively sliding parts eliminates microbiological problems.

The present invention thus provides a generator of radionuclides comprising a generator column containing the radionuclide and provided with an inlet and an outlet for eluent, first and second reservoirs for eluent, means connecting the first and second reservoirs whereby the second reservoir can be filled up from the first, and means connecting the second reservoir to the column inlet whereby a pre-determined volume of the eluent can be caused to pass from the second reservoir through the column so as to elute the radionuclide therefrom.

characterized in that a part defining the second reservoir is rotatable such that the orientation of the part determines the volume of eluent passed from the second reservoir through the column.

The second reservoir is of fixed volume. A part defining the reservoir, which part may be the whole reservoir, is rotatable. Depending on the orientation of that part, either the whole or a pre-determined fraction of the eluent in the second reservoir can be caused to pass through the generator column An embodiment is described in which the whole second reservoir is rotatable about a horizontal axis, giving continuously variable volumes of eluent but requiring an external valve arrangement to control inlet and outlet of liquid.

The second reservoir is preferably provided with an aperture permitting the passage of air during filling and emptying but preventing the escape of liquid in normal operation and during transit. There are commercially available hydrophobic filters which perform this function.

Such a generator is particularly suitable for operation by vacuum elution, that is to say by connecting an evacuated vial to the outlet of the generator column so as to suck eluent from the second reservoir through the column. The provision of an aperture to the second reservoir, as noted above, can be used to cause air to be sucked through the generator column after the eluent, so as to remove excess liquid from the column bed and lines and leave the partly-filled vial at atmospheric pressure.

In the accompanying drawings, FIGS. 1, 2 and 3 refer to an embodiment of the invention, where:

Figure 1:
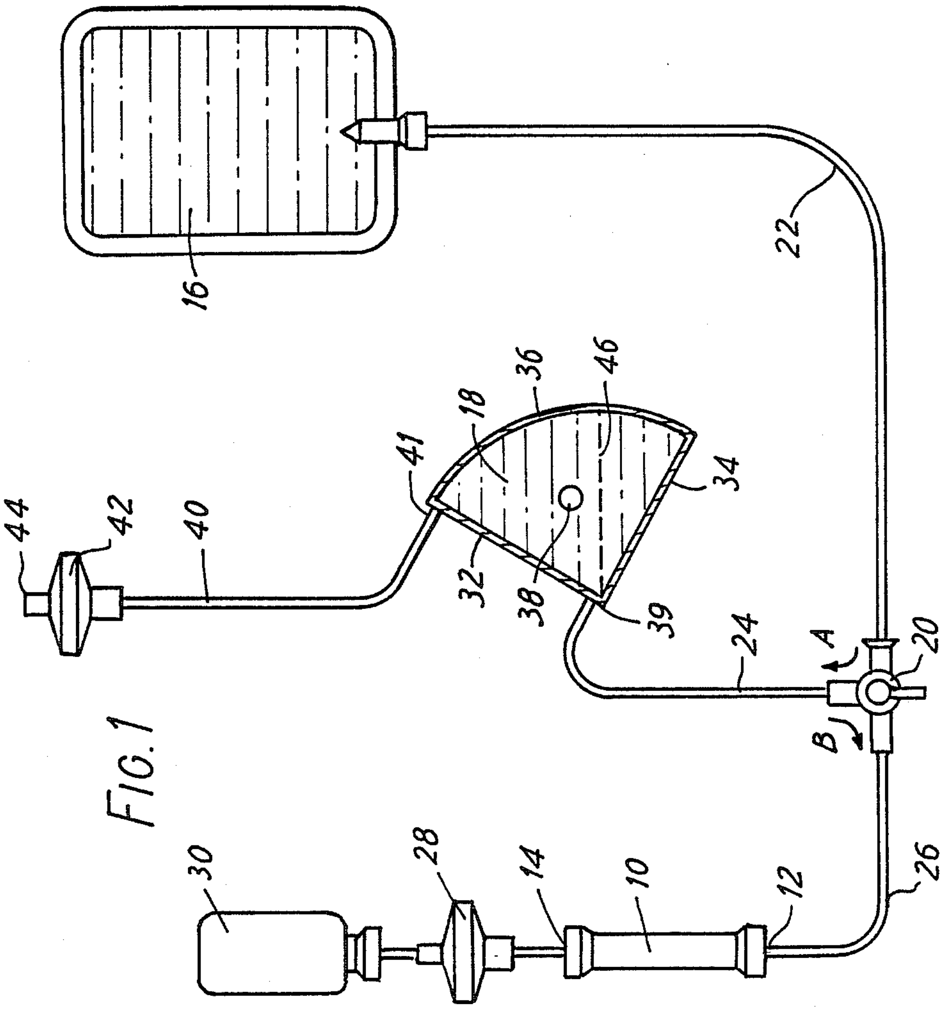
FIG. 1 is a diagram of a generator according to the invention set to deliver a relatively large volume of eluent from the second reservoir.
Figure 3:
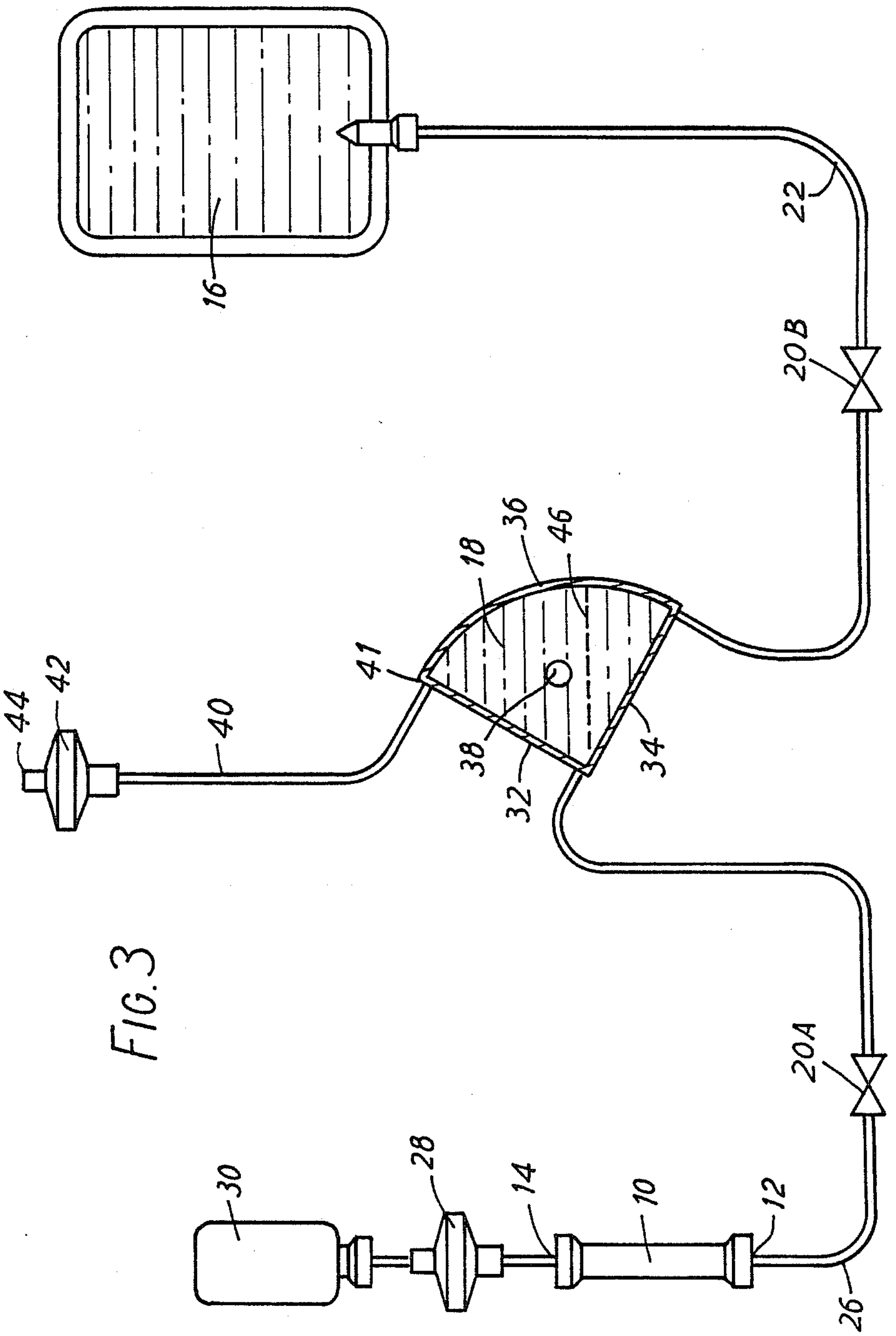
FIG. 3 is a diagram of the generator as FIG. 1 but including an alternative method of connection of inlet and outlet and valves.

Referring to FIG. 1, the generator comprises a column 10 of particulate alumina carrying molybdenum-99 adsorbed thereon, said column having an inlet 12 and an outlet 14 for eluent. A first reservoir 16 may be a collapsible bag containing typically 250 ml of sterile physiological saline solution as eluent as shown. Equally, it may be a rigid reservoir with a suitable air in-let, or under slight positive pressure. There is a rotatable second reservoir 18, showed filled with liquid, which is described in more detail below. A three-way tap 20 is connected via pipe 22 to the first reservoir, via pipe 24 to the second reservoir and via pipe 26 to the column inlet. This three-way tap can be arranged either to connect the first reservoir 16 to the second reservoir 18 (position A), or the second reservoir 18 to the column inlet 12 (position B). An alternative way of inter connection is shown in FIG. 3, indicating the use of mechanically operated pinch valves 20A and 20B on lines 26 and 22 respectively, (obviating the need for line 24). Operation of these pinch valves could be mechanically linked to other operations, such as the placing of the elution vials in position. A bactericidal filter 28 is shown mounted downstream of the column outlet 14, but could be omitted if desired. A collection vial 30 is shown connected to the outlet of the column 10, but this would only be present part of the time.

The second reservoir 18 has the shape of a segment of a cylinder, being bounded by two radial walls 32, 34 at right-angles to one another, by an arcuate wall 36 and by parallel front and back walls (not shown). To improve precision, the distance between the front and back walls may be made small in comparison with the length of the radial walls 32 and 34. The whole reservoir is rotatable within limits about a horizontal axis 38.

The pipe 24 leads from the junction 39 of the two radial walls 32, 34, to the three-way tap 20. A pipe 40 leads from the junction 41 between walls 32 and 36 to a bacterial filter 42 and a vent 44 to the atmosphere. The filter 42 and vent 44 are shown positioned above the top of the first reservoir 16. In this case the line 40 should be of sufficiently narrow bore tubing that variations in the fill level do not alter the total volume of eluate recovered significantly. However, provided the filter is of a hydrophobic material which prevents the passage of liquid, they need not be positioned so high. In this case the filter membrane will define the fill level.

The second reservoir 18 is rotatable about the axis 38 between a position at which the junction 41 is vertically above the junction 39 (for delivery of a maximum volume of eluent) and a position in which the junction 41 is at the same level as junction 39, but to the right of it when viewed in the direction of the drawing (for delivery of a minimum volume of eluent).

Figure 2:
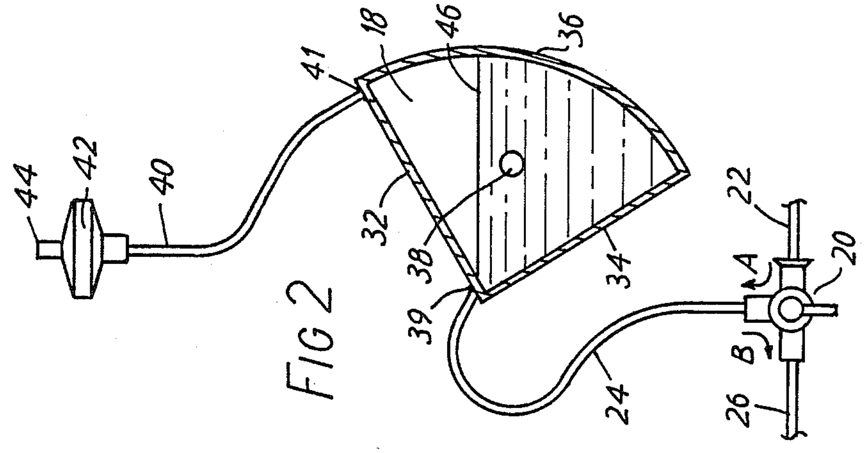
FIG. 2 is a diagram of part of the generator of FIG. 1 set having delivered a smaller volume of eluent

Operation of the generator shown in FIGS. 1 and 2 starts with the first reservoir 16 full, the second reservoir 18 empty, the tap 20 in position B and no collection vial on the column outlet and comprises the following steps.

1. The tap 20 is turned to position A. Eluent flows by gravity (or pressure, as indicated above), from the first reservoir 16 and fills the second reservoir 18 and the pipe 40 almost up to the level of the filter 42, through which air escapes.

2. An evacuated collection vial 30, larger than the volume of eluate to be collected, is connected to the outlet 14 of the generator column 10. The vial must be sufficiently large not only to accommodate the selected volume of liquid but also to permit air to be drawn through the bed of the generator. FIG. 1 shows the generator at this stage in the operating cycle.

3. The tap 20 is turned to position B. Eluent is sucked from the second reservoir 18 through the column 10 where it picks up the available technetium-99m, and into the collection vial 40. This continues until the surface of the liquid in the second reservoir 18 has fallen to the level shown by the dotted line 46. Thereafter air is sucked via the filter 42 through the column 10 until the collection vial is at atmospheric pressure. The air also serves to remove excess eluent from the column bed and tubing.

4. The collection vial 30, partly filled with eluate and at atmospheric pressure is removed.

At any time before, during or after steps 1 and 2, the volume of eluent to be delivered could have been altered by rotating the second reservoir 18 about the axis 38. The effect of doing this is illustrated in FIG. 2, which shows the position at the end of step 3. The second reservoir has been rotated about 40° clockwise. As a result, the volume of eluent delivered (before the liquid surface 46 fell below the level of the junction 39, at which point air is sucked out of the reservoir rather than liquid) amounted to rather less than half the total volume of the second reservoir 18. In the position showed in FIG. 1, the volume of eluent delivered would be about 80% of the volume of the reservoir. If the reservoir were further pivotted until the junction 41 was on a level with the junction 39, then little or no eluent would be delivered. Control over the orientation of the second reservoir 18, and hence over the volume of eluent delivered, may conveniently be by means of a dial mounted at the top of the generator on a horizontal axis. There are, of course, a number of possible simple mechanical means of coupling the operating/indicating device with the reservoir.

A second reservoir shaped as shown in FIGS. 1, 2 and 3 has the advantage that the volume of eluent delivered is linearly related to the angle by which the reservoir is rotated. But the shape of this reservoir is by no means critical. In fact, various shapes can be envisaged, bearing in mind a few principles. The junction 41 should be the highest point of the reservoir, at least during step 1 and preferably at all times. The position of the junction 39 should preferably be variable (by rotation of the reservoir) between the highest and the lowest points of the reservoir. The shape of the reservoir should preferably be designed to avoid air-locks, which could affect the volume of eluent delivered. The pipes 24 and 40 should preferably leave their respective junctions 39 and 41 in an upward direction.

Using a model generator as illustrated, with a second reservoir 18 having a total volume of 20 ml, it was easily possible in routine operation to obtain eluate volumes in the range 5 ml to 20 ml within 0.5 ml of the desired figure.

As shown, the three-way tap 20 is manually operated. However, if desired, operation of this tap could be made automatic. Thus, for example, the act of fitting a collection vial 30 to the outlet of the column 10 can be made to switch the tap from position A to position B; and the act of removing the collection vial to switch the tap from position B back to position A.

Operation of the generator shown in FIG. 3 is substantially the same as described above in relation to FIGS. 1 and 2. Referring to FIG. 3, in step 1, valve 20A is closed and valve 20B opened. And in step 3, valve 20A is opened and valve 20B closed. This valve arrangement may be more amenable to the automation referred to in the preceding paragraph.

I claim:

1. A generator of radionuclides comprising a generator column containing the radionuclide and provided with an inlet and outlet for eluent; a first reservoir containing a supply of eluent; a second reservoir of fixed volume for supplying to the column an adjustable predetermined volume of eluent; means connecting the first and second reservoirs whereby the second reservoir can be filled up from the first; means including valve means connecting an outlet of the second reservoir to the column inlet; means for rotatably mounting said second reservoir about a horizontal axis; and adjustment means for adjusting the angular position of said second reservoir about said axis to thereby vary the proportion of the total volume which lies above the outlet of the reservoir, to thus determine the amount of liquid dispensed from the reservoir when said valve means is opened, whereby a predetermined volume of the eluent can be caused to pass from the second reservoir through the column so as to elute the radionuclide therefrom under sterile conditions.

2. The generator as claimed in claim 1, including an evacuated vial connected to the outlet of the generator column.

3. The generator as claimed in claim 2, wherein the capacity of the evacuated vial is greater than the volume of the second reservoir.

4. The generator as claimed in claim 1 wherein the outlet is positioned in such a way that, in a first angular position of said second reservoir, the outlet is spaced a first vertical distance from the lowermost point of the reservoir and in a second angular position of said second reservoir, the outlet is spaced a second vertical distance from the lowermost point of the reservoir, said first distance being greater than said second distance whereby the amount dispensed upon opening of said valve means is greater when the second reservoir is in said second angular position.

5. The generator as claimed in claim 1, wherein the second reservoir is provided with an aperture provided with a hydrophobic filter permitting the passage of air but preventing the escape of liquid.

6. A method of generating a radionuclide under sterile conditions using a generator of radionuclides comprising a generator column containing the radionuclide and provided with an inlet and an outlet for eluent, a first reservoir containing a supply of eluent, a second reservoir of fixed volume for supplying to the column an adjustable predetermined volume of eluent, means connecting the first and second reservoirs whereby the second reservoir can be filled up from the first, means including valve means connecting an outlet of the second reservoir to the column inlet and means for rotatably mounting the second reservoir about a horizontal axis, said second reservoir being so shaped and arranged that, as it is rotated about said horizontal axis, that proportion of the total volume of the second reservoir which lies above the outlet is varied, which method comprises filling up the second reservoir from the first reservoir, adjusting the angular position of the second reservoir to a desired position, depending upon the volume to be dispensed, connecting an evacuated vial to the outlet of the generator column, and then opening said valve means so as to draw said predetermined volume of eluent in the second reservoir through the column and into the evacuated vial.

7. The method as claimed in claim 6, wherein the volume of the evacuated vial is greater than the predetermined volume of the eluent in the second reservoir, the method comprising, after the eluent has been drawn into the evacuated vial, the further step of drawing air through the column and into the vial by the partial vacuum in the vial so as to substantially dry the column and bring the vial to atmospheric pressure.

* * * * *